(12) United States Patent
Brumfield et al.

(10) Patent No.: US 7,874,519 B2
(45) Date of Patent: Jan. 25, 2011

(54) SPACECRAFT THREE-AXIS ATTITUDE ACQUISITION FROM SUN DIRECTION MEASUREMENT

(75) Inventors: Bruce Brumfield, Vacaville, CA (US); Xenophon H. Price, Redwood City, CA (US); George E. White, San Jose, CA (US); Philip C. Hirschberg, Fremont, CA (US); Kam Chan, Saratoga, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 535 days.

(21) Appl. No.: 11/709,614

(22) Filed: Feb. 22, 2007

(65) Prior Publication Data

US 2007/0228218 A1    Oct. 4, 2007

Related U.S. Application Data

(60) Provisional application No. 60/776,858, filed on Feb. 25, 2006.

(51) Int. Cl.
   *B64G 1/36* (2006.01)
(52) U.S. Cl. .................................... 244/171
(58) Field of Classification Search ............ 244/164, 244/171; 701/207; 340/988, 992
   See application file for complete search history.

(56) References Cited

U.S. PATENT DOCUMENTS

| 5,035,381 | A | * | 7/1991 | Matthews | 244/164 |
|---|---|---|---|---|---|
| 5,080,307 | A | * | 1/1992 | Smay et al. | 244/164 |
| 5,508,932 | A | * | 4/1996 | Achkar et al. | 701/226 |
| 5,535,965 | A | | 7/1996 | Surauer et al. | |
| 6,142,422 | A | * | 11/2000 | Stoen et al. | 244/164 |
| 6,695,263 | B1 | | 2/2004 | Goodzeit | |

* cited by examiner

Primary Examiner—Timothy D Collins
Assistant Examiner—Michael Kreiner
(74) *Attorney, Agent, or Firm*—Weaver Austin Villeneuve Sampson LLP (57) ABSTRACT

Methods and apparatus for a spacecraft (1) orbiting about a celestial body such as the Earth to reacquire operational three-axis orientation with respect to that body. A method embodiment of the invention comprises determining (201) a set of actual conditions of the spacecraft, comprising a position of the spacecraft (1) in inertial space as a function of time and a set of angular rotation rates of the spacecraft (1) with respect to a coordinate frame of the spacecraft (1), determining (202) an actual instantaneous direction of the sun with respect to the coordinate frame, and propagating (240) an estimated actual sun direction with respect to the coordinate frame as a function of time; determining (260) a desired sun direction with respect to the coordinate frame as a function of time; rotating (270) the spacecraft (1) and adjusting angular rotation rates of the spacecraft (1) so that an actual angle between the spacecraft (1) coordinate frame and the sun as a function of time substantially coincides with the desired sun direction with respect to the coordinate frame as a function of time; and, rotating (280) the spacecraft (1) around an axis defined by a line between the sun and the spacecraft until (1) the celestial body is observed by a celestial body sensor of the spacecraft.

15 Claims, 4 Drawing Sheets

SPACECRAFT THREE-AXIS ATTITUDE ACQUISITION FROM SUN DIRECTION MEASUREMENT

CROSS REFERENCES TO RELATED APPLICATIONS

This patent application claims the priority benefit of U.S. provisional patent application 60/776,858 filed on Feb. 25, 2006, and entitled "Spacecraft Three Axis Acquisition from Sun Direction Measurement", which provisional patent application is hereby incorporated by reference in its entirety.

TECHNICAL FIELD

This invention relates generally to spacecraft and, in particular, to methods and apparatus for orienting a spacecraft to a desired orbital configuration.

BACKGROUND OF THE INVENTION

The assignee of the present invention manufactures and deploys spacecraft for observation of the Earth and other celestial bodies, broadcast and communications purposes. To perform their mission, the payloads and solar panels of such spacecraft must be oriented and maintained in a particular orientation with respect to the Earth (or other celestial body) or with respect to the Earth and sun. For example, the general requirement for three-axis, body-stabilized spacecraft operating in geostationary orbit is to orient the spacecraft such that the payload is directed toward the Earth and the axis of rotation of the solar array is orthogonal to the Earth's equatorial plane. In such orientation, the solar arrays are enabled to rotate in such a manner to compensate for the spacecraft's motion with respect to the sun and thereby receive constant and continuous solar illumination to the photovoltaic cells on the array. Maintenance of this desired three-axis attitude is provided by way of attitude and rate sensors coupled to torque generators through an attitude determination and control subsystem, which includes an onboard computer referred to as the spacecraft control electronics. Attitude sensors may comprise celestial body observers, such as earth sensors, sun sensors and star trackers. Rate sensors may comprise such devices as digital integrating rate assemblies or gyros. Torque generators may comprise such devices as thrusters, magnetic torquers or momentum wheels.

The spacecraft design and operating methods must provide means to achieve the desired three-axis attitude upon the initiation of the mission and to reacquire this attitude following any planned or unplanned deviation from it. Because unplanned deviations from the desired three-axis attitude can result in service disruptions that are costly to the spacecraft operators and their customers, it is preferable that the spacecraft design and operating methods provide means to realign the spacecraft in the desired attitude in a prompt, rapid and reliable manner, with a minimal amount of operator intervention and at any time of the year and any time of day.

A number of known techniques for reacquiring Earth pointing attitude from a different known or unknown attitude have been described.

For example, U.S. Pat. No. 5,080,307 issued to Smay, et al., teaches a method of acquiring Earth-pointing attitude of a three-axis, body-stabilized spacecraft orbiting the Earth, including the steps of (1) aligning the roll axis to the spacecraft with the sun line; (2) orienting the spacecraft such that the angle formed between the yaw axis and the sun line is equal to the Earth-sun angle; (3) orienting the spacecraft such that the yaw axis is aligned with the center of the Earth; (4) rotating the spacecraft about its yaw axis until its pitch axis is oriented normal to the orbit plane. Disadvantages of this method include the necessity to perform four discrete maneuvers, and the fact that the method requires initially aligning the spacecraft roll axis with the sun line, both of which require expenditures of time and attitude control propellant which are minimized by the present invention.

U.S. Pat. No. 6,695,263, issued to Goodzeit, teaches a method for earth reacquisition by (1) determining three-axis inertial attitude by rotating the spacecraft slowly about its pitch axis while measuring star patterns; (2) adjusting the attitude to align the pitch axis with (parallel to) the Earth pole axis; (3) rotating the spacecraft about the pitch axis to establish communications with the ground. This method is disadvantageous compared to the present invention inasmuch as it requires over an hour to execute, requires expensive star trackers that are often not otherwise required for a spacecraft mission, and requires extensive intervention by spacecraft ground controllers.

U.S. Pat. No. 5,535,965 issued to Surauer, et al., teaches a sun and earth acquisition method avoiding dependence on gyros by use of wide field of view sun sensors and at least one earth sensor. Disadvantages of this method include a requirement for software to estimate spacecraft rotation rates from 2-axis position measurements resulting in very complicated algorithms. Additionally, certain spacecraft reorientations such as those needed during orbit transfer require additional earth sensors with a consequential added expense that is avoided by the teaching of the present invention. Finally, the method taught by Surauer, et al., results in acquiring the Earth in an earth sensor field of view but does not orient the spacecraft attitude angle about the Earth-to-spacecraft line. By contrast, the present invention uses a conventional hardware suite with gyros, to enable a reacquisition method that results in the spacecraft acquiring a desired 3-axis attitude.

U.S. Pat. No. 6,142,422 issued to Stoen, et al., teaches a method to orient the spacecraft along an inertial direction of interest by the steps of operating a sensor to provide an initial fix on the inertial direction of interest; repetitively determining a difference between a commanded quaternion and a quaternion estimated based on sensed angular rates; and selectively applying torques to the spacecraft so as to drive the difference towards zero such that a spacecraft vector is aligned with the inertia direction of interest, thereby orienting the spacecraft. Although the method disclosed by Stoen, et al., is useful in accomplishing the objectives of the present invention, Stoen does not teach a method of aligning a spacecraft in a three-axis attitude with respect to the Earth and the sun.

Still other methods of reacquiring Earth-pointing orientation are known that present similar difficulties with respect to time to reacquire, hardware cost and requirements for operator intervention.

Accordingly, it is an objective of the present invention to provide a method for aligning a spacecraft in a desired three-axis attitude with respect to both the sun and the Earth or other celestial body at any time of day in accordance with a method capable of autonomous or semi-autonomous execution.

It is a further objective of the present invention to provide a method for fast reacquisition of Earth-normal attitude using existing spacecraft resources of sensors, ephemeris and clock data, and onboard spacecraft computational capabilities.

Yet further objectives of the present invention are to minimize the burden on the spacecraft operator and eliminate dependency on telemetry and command coverage from the ground. The present invention does not require operator calculation of reorientation angles, ground generation of commands via manual commands or time-tagged commanding.

DISCLOSURE OF INVENTION

Methods and apparatus for a spacecraft (1) orbiting about a celestial body to reacquire operational three-axis orientation with respect to that body. A method embodiment of the invention comprises determining (201) a set of actual conditions of the spacecraft, comprising a position of the spacecraft (1) in inertial space as a function of time and a set of angular rotation rates of the spacecraft (1) with respect to a coordinate frame of the spacecraft (1), determining (202) an actual instantaneous direction of the sun with respect to the coordinate frame, and propagating (240) an estimated actual sun direction with respect to the coordinate frame as a function of time; determining (260) a desired sun direction with respect to the coordinate frame as a function of time; rotating (270) the spacecraft (1) and adjusting angular rotation rates of the spacecraft (1) so that an actual angle between the spacecraft (1) coordinate frame and the sun as a function of time substantially coincides with the desired sun direction with respect to the coordinate frame as a function of time; and, rotating (280) the spacecraft (1) around an axis defined by a line between the sun and the spacecraft until (1) the celestial body is observed by a celestial body sensor of the spacecraft.

BRIEF DESCRIPTION OF THE DRAWINGS

Features of the invention are made more apparent in the ensuing detailed description of the preferred embodiments of the invention when read in conjunction with the attached drawings, wherein.

Throughout the Figures, the same reference numerals and characters, unless otherwise stated, are used to denote like features, elements, components, or portions of the illustrated embodiments. Moreover, while the subject invention will now be described in detail with reference to the Figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

In accordance with the teachings of this invention, a desired three-axis attitude with respect to each of the sun and the Earth or other celestial body (such as the moon of Earth, another planet or a moon of another planet) is acquired by the novel use of existing spacecraft resources and equipment, including spacecraft control electronics, rate and attitude sensors and torque generators and using knowledge of spacecraft orbital ephemeris data and epoch time that is normally available to the spacecraft control electronics. According to the teachings of the present invention, a spacecraft constructed and operated in accordance therewith may reacquire a desired three-axis attitude from any arbitrary and unknown attitude.

Because the present invention primarily resides in a method for correcting the attitude and angular rates of a spacecraft, a detailed description of the hardware for implementing this method is not required. It should be understood by those skilled in the art that conventional spacecraft attitude determination and control systems incorporate spacecraft control electronics, torque generators, rate sensors and celestial body observers suitable for the practice of the method employed in the present invention. Furthermore, although this written description, for purposes of illustration, refers to the celestial body about which the spacecraft orbits as the Earth, those skilled in the art will recognize that the teachings of the present invention are equally applicable to any celestial body other than the sun.

Figure 1:
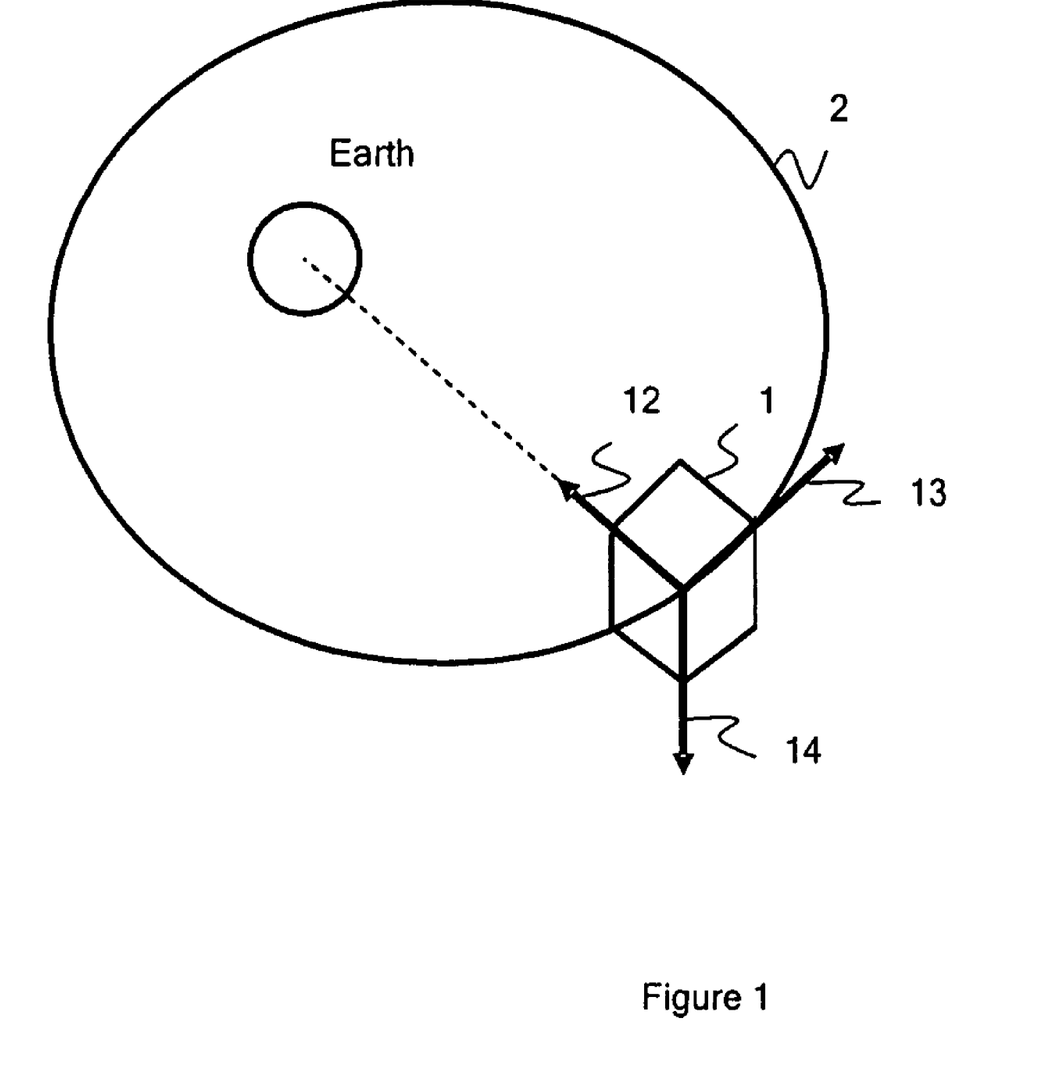
FIG. 1 is a diagrammatical illustration of a spacecraft 1 with a defined three-axis coordinate frame in an Earth-pointing attitude.

Understanding of the method according to the present invention will be facilitated by reference to FIG. 1, wherein a conventional Earth-orbiting spacecraft, 1, with defined three-axis coordinate frame is depicted. The spacecraft 1 occupies an orbit 2 around the Earth. By convention, the three axes of the spacecraft coordinate frame are denominated the roll, pitch and yaw axes. By convention, when a spacecraft is in a nominal three-axis attitude, the yaw axis 12 is substantially coincident with a line from the spacecraft coordinate frame origin to the Earth. The roll axis 13 is defined as a line from the spacecraft coordinate frame origin orthogonal to the yaw axis and substantially coincident with the spacecraft velocity vector. A line from the origin of the spacecraft coordinate frame and mutually orthogonal to both the roll and yaw axes, defines the pitch axis 14.

It will be evident to those skilled in the art that the direction of the sun with respect to the spacecraft coordinate frame will vary with time in a manner fully determinable from the spacecraft orbital parameters and epoch time as long as the spacecraft is in the normally desired three-axis attitude with respect to the Earth. Computation of this direction (hereinafter referred to as the desired sun direction) as a function of time may be performed given orbital ephemeris data either on the ground by spacecraft controllers or on-board the spacecraft by the spacecraft control electronics. Orbital ephemeris data, which refers to a numerical table listing the position of a spacecraft at regular intervals throughout its orbit is readily generated by known means and may be uploaded to the spacecraft control electronics at periodic intervals, so that the data is available to the spacecraft control electronics even if the spacecraft is temporarily out of contact with ground controllers due to an anomaly. Similarly, the spacecraft control electronics will ordinarily have accurate on-board clocks, periodically calibrated by the spacecraft operators, that provide an independent, continuously updated measure of time with respect to a known epoch.

Figure 2A:
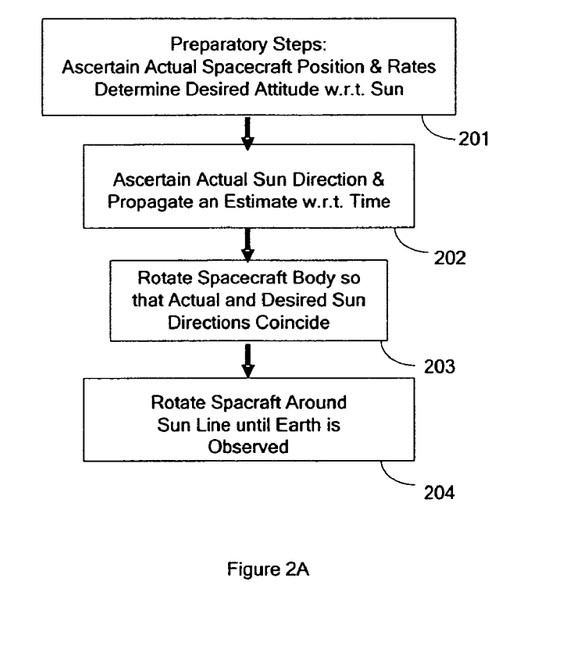
FIG. 2A is a generalized logic flow diagram of the present invention.

A generalized flow diagram of a method according to the present invention is provided in FIG. 2A. First, certain preparatory steps are taken 201 to ascertain the spacecraft's initial position, angular rotation rates, and desired attitude with respect to the sun. Angular rate information is obtained from on-board rate sensors, such as digital integrating rate assemblies or gyros. This information provides the spacecraft control electronics with continuous angular rate information indicative of the rotation of the spacecraft in inertial space. Orbital ephemeris data and epoch time stored by conventional means in the spacecraft control electronics is used by the spacecraft control electronics to calculate the desired direction of the sun with respect to a spacecraft three-axis coordinate frame. The desired direction of the sun is the direction, defined with respect to the spacecraft coordinate frame axes, which exists when the spacecraft is in its desired three-axis attitude. The desired sun direction with respect to the spacecraft three-axis coordinate frame as a function of time is known to or computed by the spacecraft control electronics, based on the spacecraft orbit ephemeris data and knowledge of elapsed time with respect to an arbitrary, known, epoch.

Next, an actual initial sun direction with respect to the spacecraft coordinate frame axes is ascertained 202, either by direct measurement by a sensor, or by estimation based on a summing of integrated rate data to the last known attitude. This step also includes propagating an estimate of the actual sun direction as a function of time based on the previously determined angular rate information and initial sun direction.

Next, torque generators are used 203 to rotate the spacecraft body so that the actual sun direction is coincident with the desired sun direction, and to null out undesired rotational rates. In a preferred embodiment, a quaternion based calculation is used to compute a smoothly varying profile for the spacecraft attitude to follow when rotating in such manner that the actual sun direction is caused to coincide with the desired sun direction, and so that the maneuver may be accomplished in a single step.

Finally, torque generators are used 204 to rotate the spacecraft body around an axis defined by a line between the sun and the spacecraft. This rotation is stopped at the point that the Earth is observed by the Earth sensor, at which point normal spacecraft control mode can be resumed.

Figure 2B:
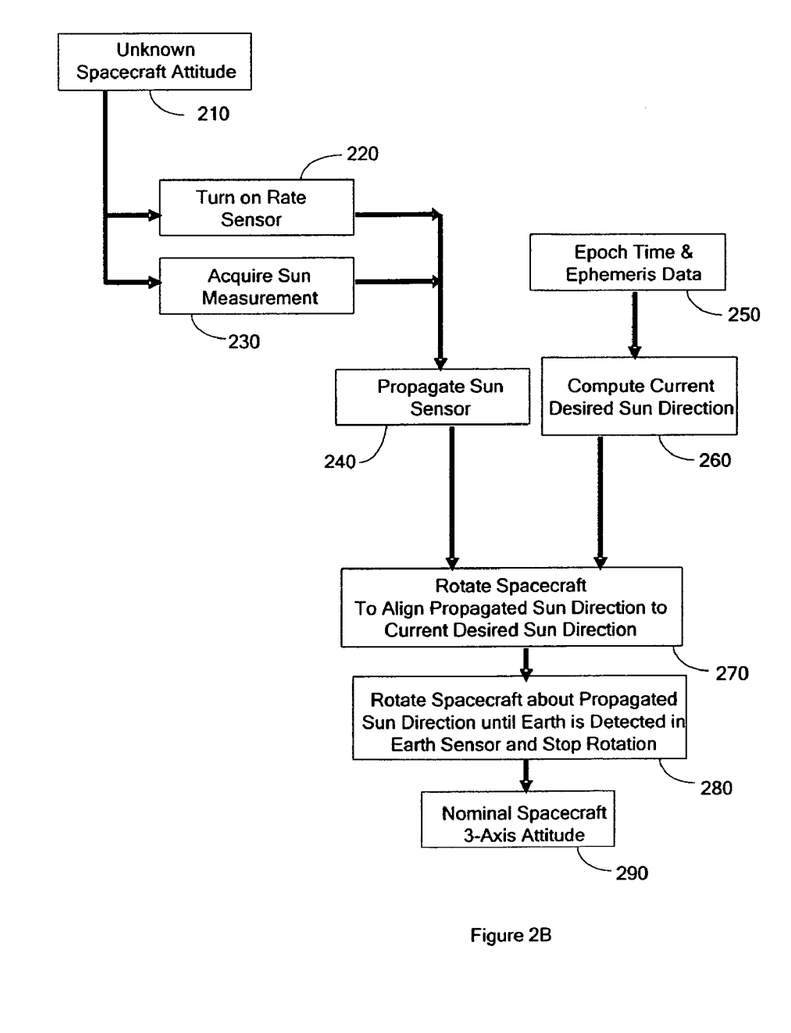
FIG. 2B is a logic flow diagram illustrating one embodiment of the present invention.

The method according to the present invention will now be described with reference to FIG. 2B, which is a flow chart illustrating exemplary process steps used to practice one embodiment of the present invention. FIG. 2B is predicated on the assumption that normal Earth-pointing attitude has been lost and that the spacecraft is, accordingly, in an unknown attitude 210. Moreover, it is assumed that rate sensors are not operating, so the spacecraft is assumed to be tumbling at unknown rates. To recover from this condition and reacquire normal Earth-pointing attitude in accordance with this invention, the following steps are executed.

Rate sensors are actuated on, at step 220. This is preferably accomplished autonomously by logic embedded in the spacecraft control electronics, but may be accomplished by ground command. A measurement of the actual instantaneous sun direction is acquired, at step 230.

An estimate of the actual sun direction with respect to the spacecraft coordinate frame is propagated, at step 240, based on the aforementioned measured instantaneous sun direction and knowledge of the spacecraft angular rotation rates in inertial space provided by the aforementioned rate sensors. This propagation estimate can advantageously be performed using quaternion algebra.

Independently of the aforementioned steps, the spacecraft control electronics computes the current desired sun direction 260 based on spacecraft epoch time and ephemeris data 250. In a preferred embodiment, epoch time and ephemeris data are available to the spacecraft control electronics without intervention from spacecraft ground controllers as a result, for example, of periodic uploading of the time and orbit data to the spacecraft, or on-board computation means.

Next, a spacecraft rotational maneuver 270 is executed to align the spacecraft attitude such that the sun direction with respect to the spacecraft coordinate frame coincides with the desired sun direction. In a preferred embodiment, this maneuver simultaneously will eliminate undesired angular rates. The maneuver is accomplished through signals sent from the spacecraft control electronics to spacecraft torque generators, for example, thrusters. The required signals are generated within the spacecraft control electronics, using means known in the art.

Next, a spacecraft rotational maneuver 280 is executed to align the spacecraft in nominal spacecraft 3-axis attitude 290. The axis of rotation for this maneuver is the line between the origin of the spacecraft coordinate frame and the sun. The rotation maneuver may be initiated automatically by the spacecraft control electronics, or by command from ground controllers. The rotation rate will be reduced to zero when the Earth is detected by the Earth sensor. Nulling of the rotation rate may be accomplished automatically by the spacecraft control electronics, or by command from ground controllers. At the completion of step 280, both the Earth and sun are in the desired direction with respect to the spacecraft coordinate frame, and nominal three-axis attitude has been established.

Figure 3:
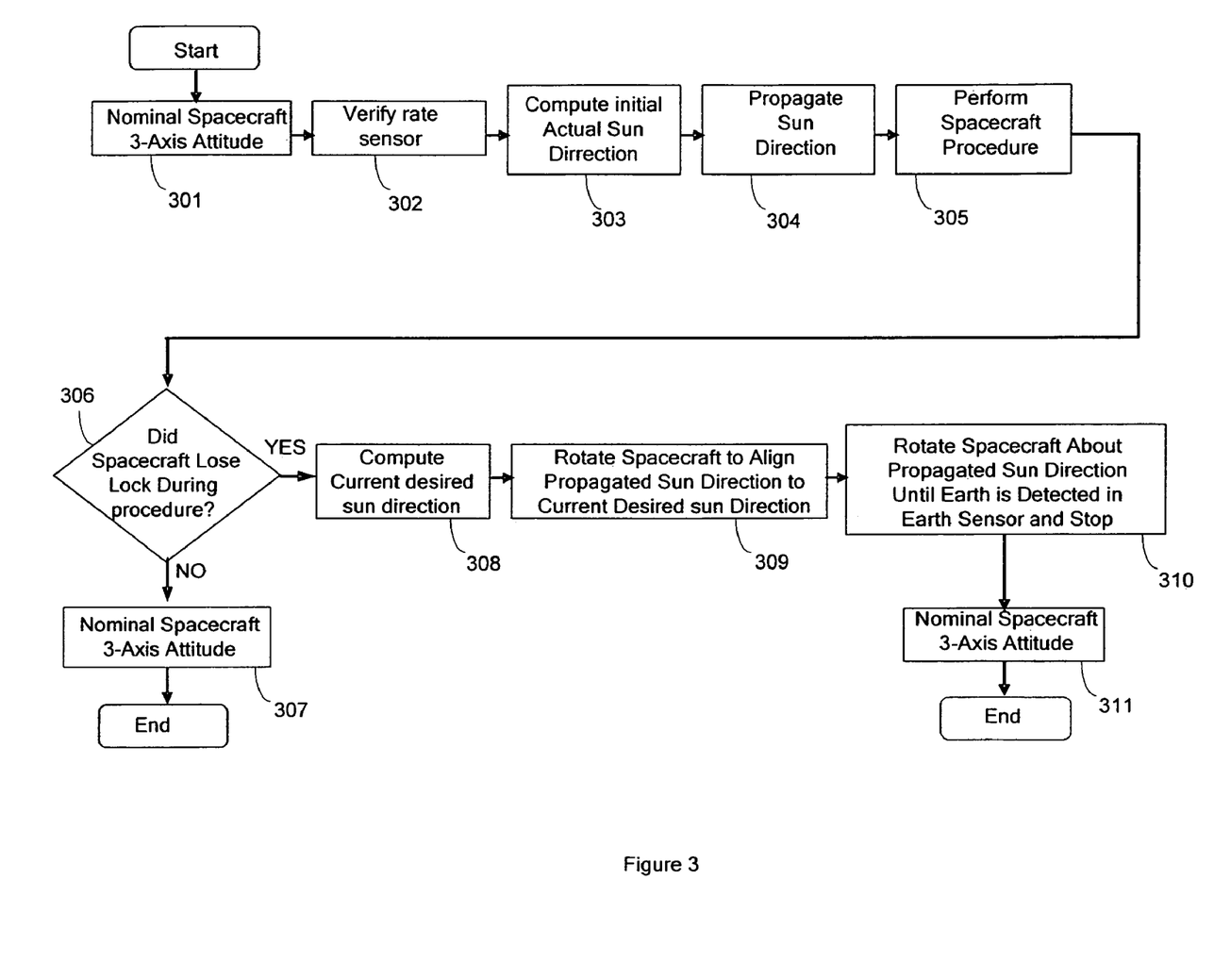
FIG. 3 is a logic flow diagram illustrating a second embodiment of the present invention; and, FIG. 4 is a functional block diagram illustrating the functional relationship of various steps in the process with elements of the spacecraft 1 attitude determination and control system.

An additional embodiment of the present invention will now be described with reference to FIG. 3, which is a flow chart illustrating exemplary process steps used to practice one embodiment of the present invention. In this embodiment, the inherent risk that certain spacecraft procedures will cause a loss of desired three-axis attitude is mitigated by preparatory steps so that the reacquisition maneuvers in accordance with the present invention may be seamlessly executed. In accordance with this embodiment of the invention, prior to certain spacecraft procedures, the spacecraft is in nominal 3-axis attitude with respect to a celestial body and the sun, at step 301. Rate sensors are turned on or verified to be actuated on, at step 302. An initial sun direction is computed based on direct measurement or knowledge of the spacecraft attitude and orbit ephemeris data, at step 303.

An estimate of the actual sun direction with respect to the spacecraft coordinate frame is propagated, at step 304, based on an initially known sun direction and knowledge of the spacecraft angular rotation rates in inertial space provided by the aforementioned rate sensors. This propagation estimate can advantageously be calculated using quaternion algebra.

Next, a spacecraft procedure is performed, at step 305. This procedure, for example, may be a deployment or orbit adjustment maneuver, or some other operation known to the spacecraft operators to entail a risk of loss of three-axis attitude. During the procedure and thereafter, the spacecraft control electronics and, advantageously, spacecraft ground controllers, will monitor the attitude of the spacecraft to determine whether there was a loss of desired three-axis attitude during the procedure, at step 306. If it is determined that no loss of desired three-axis attitude occurred, the spacecraft will continue or resume operation nominal three-axis attitude, at step 307, without further recourse to the teachings of the present invention.

Contrariwise, when the spacecraft is determined to have experienced a loss of nominal three-axis attitude, spacecraft ground controllers, or, advantageously, the spacecraft control electronics, execute step 308, and compute the current desired sun direction based on spacecraft epoch time and ephemeris data.

Next, a spacecraft rotational maneuver, step 309, is executed to align the spacecraft attitude such that the sun direction with respect to the spacecraft coordinate frame coincides with the desired sun direction. In a preferred embodiment, this maneuver simultaneously eliminates undesired angular rates. The maneuver is accomplished through signals sent from the spacecraft control electronics to spacecraft torque generators, for example, thrusters. The required signals are preferably generated autonomously within the spacecraft control electronics, using means known in the art including, advantageously, quaternion algebra. Alternatively, the required signals may be generated by ground controllers and transmitted to the spacecraft control electronics.

Next, a spacecraft rotational maneuver, step 310, is executed to align the spacecraft in nominal spacecraft 3-axis attitude, step 311. The axis of rotation for this maneuver is the line between the spacecraft coordinate frame origin and the sun. The rotation maneuver may be initiated automatically by the spacecraft control electronics, or by command from ground controllers. The rotation rate is reduced to zero upon the Earth being detected by the Earth sensor. Nulling of the rotation rate may be accomplished automatically by the spacecraft control electronics, or by command from ground controllers. At the completion of step 311, both the Earth and sun are in the desired direction with respect to the spacecraft coordinate frame, and nominal three-axis attitude has been established.

Figure 4:
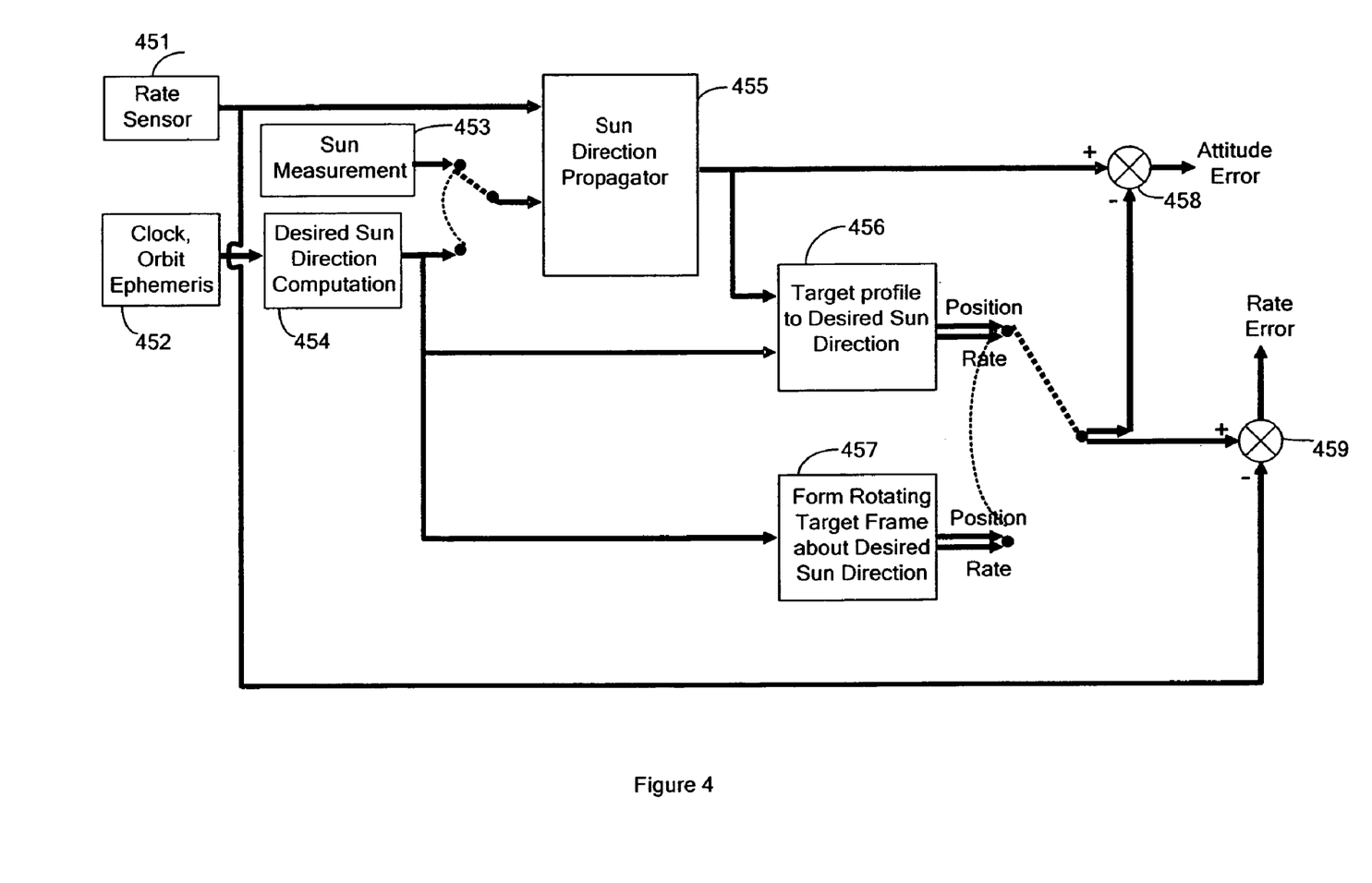

Understanding of the teachings of the present invention may be further advanced by reference to FIG. 4, which illustrates a functional block diagram showing the interrelationship of key aspects of the invention with conventional spacecraft resources. As described hereabove, initial parameters necessary to employ the method of the present invention are rate sensor data 451 clock and orbit ephemeris data 452 and actual sun direction measurement 453. According to the present invention, the outputs of block 451 and 453 are used to compute a propagated direction of the sun with respect to the spacecraft coordinate frame, preferably using quaternion algebra. Only the actual sun direction measurement 453 is required to initialize the computation 455; thereafter, the computation 455 is preferably based on successive outputs of rate sensors 451. The computation means to perform this computation, termed the sun direction propagator, is represented by block 455.

In an alternative method, clock and orbit ephemeris data 452 is used to compute the desired sun direction 454, which initializes the sun direction propagator 455. Accordingly, in this alternative method, an actual sun measurement 453 is not required. This initialization method is preferable when the actual sun position is known to substantially coincide with the desired sun direction 454 as would normally be the case, for example, when employing the method described in FIG. 3.

Output from the sun direction propagator 455 is combined with the output of 454, to generate a target maneuver profile 456 being, for example, preferred values of attitude and rates as a function of time to optimally accomplish rotation of the attitude of the spacecraft while damping undesired rates. The output of 456 may include profiles of desired attitude and rate as a function of time that result in a smooth rotation of the spacecraft attitude until the sun direction propagator output 455 is substantially coincidental with the desired sun direction 454. The desired attitude is continuously compared with the output of the sun direction propagator 455 in comparator means 458, and the resulting difference is treated as an attitude error by the conventional spacecraft controller. Similarly, a desired rate output from block 456 is continuously compared with the output of the rate sensors, 451 in comparator means 459, and the resulting difference is treated as a rate error by the conventional spacecraft controller. Simulated operation of this control loop has demonstrated an ability to align the actual sun direction with the desired sun direction within 10 minutes for a typical geosynchronous spacecraft.

With further reference to FIG. 4, when the spacecraft three axis attitude has been corrected so that the actual sun direction is aligned with the desired sun direction, rotation about a line (hereinafter, the "sun line") between the spacecraft and the sun may be initiated by command from the spacecraft ground controllers, or by automatic logic in the spacecraft control electronics. During this step of the method, a rotating frame profile is generated by the means represented by block 457 and the means of block 456 is disengaged. The input of block 457 is the desired sun direction, which, as a result of accomplishing the preceding step, is coincident with the actual sun direction. The output of block 457 represents preferred values of attitude and rates as a function of time to optimally accomplish rotation of the spacecraft around the sun line while damping undesired rates. The output of block 457 comprises profiles of desired attitude and rate as a function of time. The desired attitude is continuously compared with the output of the sun direction propagator 455 in comparator means 458, and the resulting difference is treated as an attitude error by the conventional spacecraft controller. Similarly, a desired rate output from block 457 is continuously compared with the output of the rate sensors, 451 in comparator means 459, and the resulting difference is treated as a rate error by the conventional spacecraft controller. Rotation about the sun line is continued until desired three-axis attitude is acquired at which point the rotation is stopped by command from spacecraft ground controllers or by on-board logic within the spacecraft control electronics. Simulated operation of this control loop has demonstrated an ability to attain normal three-axis attitude within 20 minutes of initiating the rotation.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention. For example, although the foregoing disclosure has referred to the Earth as the celestial body about which the spacecraft orbits, the teachings of the present invention are equally applicable to any celestial body, other than the sun, about which a spacecraft may orbit.

We claim:

1. A method for orienting a spacecraft orbiting about a celestial body, said method comprising the steps of:

determining a set of actual conditions of the spacecraft, said set of actual conditions comprising (i) a position of the spacecraft in inertial space as a function of time, (ii) a set of angular rotation rates of the spacecraft, said set of angular rotation rates being described with respect to a coordinate frame of the spacecraft, and (iii) an actual instantaneous direction of the sun, said actual instantaneous direction being described with respect to the coordinate frame;

propagating an estimated sun direction, described with respect to the coordinate frame, said estimated sun direction being an estimate of the actual sun direction propagated as a function of time based on the previously determined set of angular rotation rates and the actual instantaneous direction of the sun;

determining a desired sun direction, said desired sun direction varying as a function of time and being described with respect to the coordinate frame using orbital ephemeris data and actual time with respect to a known epoch;

rotating the spacecraft and adjusting angular rotation rates of the spacecraft so that (i) an actual angle between the spacecraft coordinate frame and the sun substantially coincides with the desired sun direction with respect to the coordinate frame, and (ii) said actual angle and said desired sun direction vary as a function of time in a substantially similar manner; and, rotating the spacecraft around an axis defined by a line between the sun and the spacecraft until the celestial body is observed by a celestial body sensor of the spacecraft.

2. The method of claim 1, wherein prior to the step of determining a set of actual conditions, at least one element of the set of actual conditions is arbitrary and unknown.

3. The method of claim 1, wherein prior to the step of determining a set of actual conditions, every element of the set of actual conditions is arbitrary and unknown.

4. The method of claim 1, wherein the step of determining a set of actual conditions includes determining an output of a set of spacecraft rate sensors.

5. The method of claim 4, wherein the set of spacecraft rate sensors is actuated autonomously by logic embedded in a control electronics module of the spacecraft.

6. The method of claim 4, wherein the set of rate sensors is actuated by a ground controller command.

7. The method of claim 1, wherein the step of propagating an estimated actual sun direction is accomplished using quaternion algebra.

8. The method of claim 1, wherein the step of rotating the spacecraft and adjusting rotation rates of the spacecraft is accomplished in accordance with a quaternion based calculation.

9. The method of claim 1, wherein the step of rotating the spacecraft and adjusting rotation rates of the spacecraft is accomplished in a single maneuver.

10. The method of claim 1, wherein the step of rotating the spacecraft and adjusting rotation rates of the spacecraft is accomplished autonomously.

11. A method for orienting a spacecraft orbiting about a celestial body, said method comprising the steps of:

determining a set of actual angular rotation rates of the spacecraft, said set of actual angular rotation rates being described with respect to a coordinate frame of the spacecraft while said spacecraft is in a substantially nominal 3-axis attitude with respect to a celestial body and the sun;

determining a position of the spacecraft in inertial space as a function of time;

determining an actual instantaneous direction of the sun, said actual instantaneous direction being described with respect to the coordinate frame;

propagating an estimated sun direction, described with respect to the coordinate frame, said estimated sun direction being an estimate of the actual sun direction propagated as a function of time based on the previously determined actual angular rotation rates and the actual instantaneous direction of the sun;

performing a spacecraft procedure;

monitoring an actual attitude of the spacecraft with respect to the celestial body and the sun; and when said monitoring detects an abnormal departure from the nominal 3-axis attitude with respect to the celestial body and the sun:

determining a desired sun direction, said desired sun direction varying as a function of time and being described with respect to the coordinate frame, using orbital ephemeris data and actual time with respect to a known epoch;

rotating the spacecraft and adjusting angular rotation rates of the spacecraft so that (i) an actual angle between the spacecraft coordinate frame and the sun substantially coincides with the desired sun direction with respect to the coordinate frame, and (ii) said actual angle and said desired sun direction vary as a function of time in a substantially similar manner; and, rotating the spacecraft around an axis defined by a line between the sun and the spacecraft until the celestial body is observed by a celestial body sensor of the spacecraft.

12. The method of claim 11, wherein the step of propagating an estimated actual sun direction is accomplished using quaternion algebra.

13. The method of claim 11, wherein the step of rotating the spacecraft and adjusting angular rotation rates of the spacecraft is accomplished in accordance with a quaternion based calculation.

14. The method of claim 11, wherein the step of rotating the spacecraft and adjusting angular rotation rates of the spacecraft is accomplished in a single maneuver.

15. The method of claim 11, wherein the step of rotating the spacecraft and adjusting angular rotation rates of the spacecraft is accomplished autonomously.

* * * * *

UNITED STATES PATENT AND TRADEMARK OFFICE
CERTIFICATE OF CORRECTION

| | | |
|---|---|---|
| PATENT NO. | : 7,874,519 B2 | Page 1 of 3 |
| APPLICATION NO. | : 11/709614 | |
| DATED | : January 25, 2011 | |
| INVENTOR(S) | : Bruce Brumfield | |

It is certified that error appears in the above-identified patent and that said Letters Patent is hereby corrected as shown below:

Title page, illustrative fig. 1 should be deleted and substitute therefore the attached title page consisting of illustrative fig. 1.

In the Drawings

The drawing sheet 1 of 4 consisting of Fig(s) 1 should be deleted and substitute therefore the attached drawing sheet 1 of 4 consisting of Fig(s) 1.

Signed and Sealed this
Ninth Day of August, 2011

David J. Kappos
*Director of the United States Patent and Trademark Office*

(12) United States Patent
Brumfield et al.

(10) Patent No.: US 7,874,519 B2
(45) Date of Patent: Jan. 25, 2011

(54) SPACECRAFT THREE-AXIS ATTITUDE ACQUISITION FROM SUN DIRECTION MEASUREMENT

(75) Inventors: Bruce Brumfield, Vacaville, CA (US); Xenophon H. Price, Redwood City, CA (US); George E. White, San Jose, CA (US); Philip C. Hirschberg, Fremont, CA (US); Kam Chan, Saratoga, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 535 days.

(21) Appl. No.: 11/709,614

(22) Filed: Feb. 22, 2007

(65) Prior Publication Data
US 2007/0228218 A1 Oct. 4, 2007

Related U.S. Application Data

(60) Provisional application No. 60/776,858, filed on Feb. 25, 2006.

(51) Int. Cl.
*B64G 1/36* (2006.01)
(52) U.S. Cl. ............................................. 244/171
(58) Field of Classification Search ........... 244/164, 244/171; 701/207; 340/988, 992
See application file for complete search history.

(56) References Cited

U.S. PATENT DOCUMENTS

| | | | |
|---|---|---|---|
| 5,035,381 A * | 7/1991 | Matthews | 244/164 |
| 5,080,307 A * | 1/1992 | Smay et al. | 244/164 |
| 5,508,932 A * | 4/1996 | Achkar et al. | 701/226 |
| 5,535,965 A | 7/1996 | Surauer et al. | |
| 6,142,422 A * | 11/2000 | Stoen et al. | 244/164 |
| 6,695,263 B1 | 2/2004 | Goodzeit | |

* cited by examiner

*Primary Examiner*—Timothy D Collins
*Assistant Examiner*—Michael Kreiner
(74) *Attorney, Agent, or Firm*—Weaver Austin Villeneuve Sampson LLP (57) ABSTRACT

Methods and apparatus for a spacecraft (1) orbiting about a celestial body such as the Earth to reacquire operational three-axis orientation with respect to that body. A method embodiment of the invention comprises determining (201) a set of actual conditions of the spacecraft, comprising a position of the spacecraft (1) in inertial space as a function of time and a set of angular rotation rates of the spacecraft (1) with respect to a coordinate frame of the spacecraft (1), determining (202) an actual instantaneous direction of the sun with respect to the coordinate frame, and propagating (240) an estimated actual sun direction with respect to the coordinate frame as a function of time; determining (260) a desired sun direction with respect to the coordinate frame as a function of time; rotating (270) the spacecraft (1) and adjusting angular rotation rates of the spacecraft (1) so that an actual angle between the spacecraft (1) coordinate frame and the sun as a function of time substantially coincides with the desired sun direction with respect to the coordinate frame as a function of time; and, rotating (280) the spacecraft (1) around an axis defined by a line between the sun and the spacecraft until (1) the celestial body is observed by a celestial body sensor of the spacecraft.

15 Claims, 4 Drawing Sheets

Figure 1